United States Patent [19]

Mikami

[11] Patent Number: 4,552,236
[45] Date of Patent: Nov. 12, 1985

[54] DISTRIBUTION TABLE FOR CONTROLLING FEED RATE OF ARTICLES SUPPLIED IN AUTOMATIC WEIGHING APPARATUS

[75] Inventor: Yoshiharu Mikami, Kyoto, Japan

[73] Assignee: Kabushiki Kaisha Ishida Koki Seisakusho, Kyoto, Japan

[21] Appl. No.: 416,323

[22] Filed: Sep. 9, 1982

[30] Foreign Application Priority Data

Sep. 10, 1981 [JP] Japan .............................. 56-135111[U]

[51] Int. Cl.$^4$ ...................... G01G 19/22; G01G 21/28
[52] U.S. Cl. ......................................... 177/25; 177/58; 177/DIG. 11
[58] Field of Search ........... 177/25, 145, 58, DIG. 11; 198/533, 756

[56] References Cited

U.S. PATENT DOCUMENTS

| 3,178,068 | 4/1965 | Dumbaugh | 198/756 X |
|---|---|---|---|
| 3,282,464 | 1/1966 | Kohl | |
| 3,414,112 | 12/1968 | Ravn | 198/757 X |
| 4,398,612 | 8/1983 | Mikami et al. | 177/25 |
| 4,487,338 | 12/1984 | Oshima et al. | |

FOREIGN PATENT DOCUMENTS

| 517245 | 9/1980 | Australia. |
|---|---|---|
| 401639 | 10/1965 | France. |
| 2064496 | 6/1981 | United Kingdom. |

OTHER PUBLICATIONS

European Search Report Completed Dec. 6, 1982, The Hague.

Primary Examiner—George H. Miller, Jr.
Attorney, Agent, or Firm—Staas & Halsey

[57] ABSTRACT

A distribution table for distributing supplied articles to a supply trough in order to be weighed. The distribution table has an upper surface which is shaped to conform to the mobility of the articles to be supplied. In embodiments of the invention, distribution tables are provided having a surface in the form of a truncated cone for articles with poor mobility, a surface provided with a centrally located hemispherical projection and a surrounding flat portion for articles having ordinary mobility, and a surface provided with a centrally located projection and an annular projection formed along the outer periphery of the table for articles which exhibit excellent mobility.

2 Claims, 5 Drawing Figures

DISTRIBUTION TABLE FOR CONTROLLING FEED RATE OF ARTICLES SUPPLIED IN AUTOMATIC WEIGHING APPARATUS

BACKGROUND OF THE INVENTION

This invention relates to a distribution table for controlling the feed rate of articles which are to be supplied in an automatic weighing apparatus. More particularly, the invention relates to a distribution table of the type described which is well-suited for use in a so-called combination computing-type automatic or combinatorial weighing apparatus which operates by computing combinations of weight values obtained from a plurality of weighing machines arranged in a circular or other pattern, finding the combination of weight values that gives a total weight equal or closest to a predetermined weight, and discharging the articles from those weighing machines corresponding to said combination.

The distribution table of the aforementioned type has a simple conical construction and therefore cannot cope effectively with changes in the mobility of articles stemming from variations in shape from one kind of article to another. A proposed solution to this problem has been merely to regulate the distribution table driving mechanism, but this expedient has not always been capable of dealing fully with large differences in article size.

SUMMARY OF THE INVENTION

An object of the present invention is to provide distribution tables of various shapes for controlling the feed rate of articles to be supplied in an automatic weighing apparatus.

Another object of the present invention is to provide a distribution table for controlling the feed rate of articles to be supplied in an automatic weighing apparatus, which distribution table is shaped to conform to the shape of the articles to be supplied.

Yet another object of the present invention is to provide a distribution table for controlling the feed rate of articles to be supplied in an automatic weighing apparatus, in which the inclined portion of the distribution table is diminished in proportion to the mobility of the articles to be supplied, the mobility of the articles depending upon their shape.

A further object of the present invention is to provide a distribution table for controlling the feed rate of articles to be supplied in an automatic weighing apparatus, in which the distribution table is formed to include a portion for suppressing the movement of the articles for use with articles which have an extremely high mobility because of their shape.

Other features and advantages of the invention will be apparent from the following description taken in connection with the accompanying drawings, in which like reference characters designate the same or similar parts throughout the figures thereof.

DESCRIPTION OF THE PREFERRED EMBODIMENTS

Figure 1:
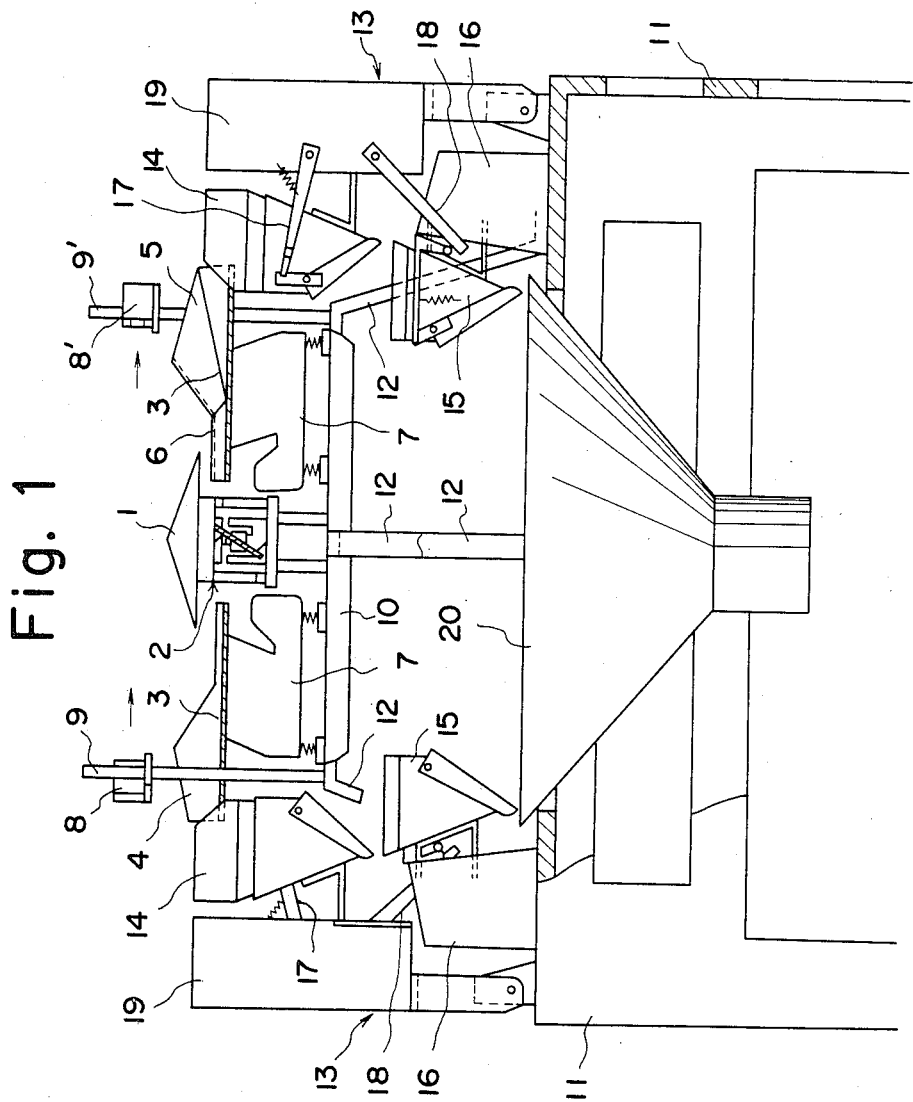
FIG. 1 is a side view showing a combination computing-type automatic weighing apparatus having a distribution table according to the prior art.
Figure 2:
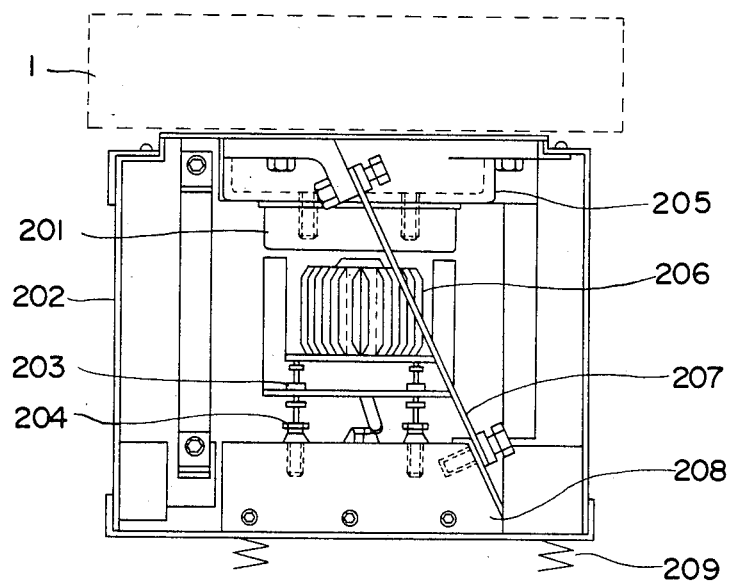
FIG. 2 is a side view showing an electromagnetic vibrating unit.

FIG. 1 is illustrative of a combination computing-type automatic weighing apparatus having a conventional distribution table. The apparatus includes a conically shaped distribution table 1 supported on an electromagnetic vibrating unit 2 for helical reciprocable vibratory motion. The distribution table may otherwise be rotated in one direction by a drive means such as an electric motor rather than the unit 2. A plurality of radial supply troughs 3, illustrated in FIG. 2, are disposed around the distribution table 1, each supply trough having a radially inward end positioned below and adjacent to an outer peripheral edge of the distribution table 11. Each supply trough 3 has a radial passage defined on one side by an angularly edged vertical wall 4 and on the other side by another wall composed of an angularly edged and outwardly inclined wall portion 5 which extends over two-thirds of the length of the trough and an outwardly inclined wall portion 6 which extends over the remaining one-third of the length of the trough. The inclined wall portions 5 and 6 have portions extending in an overhanging relation to, but spaced from, the vertical wall 4 of the adjacent supply trough 3. The supply troughs 13 are supported respectively on electromagnetic vibrating units 7. The electromagnetic vibrating units 2 and 7 are mounted on a support table 10 fixed to a plurality of support legs 12 which are in turn secured to a frame 11. The support table 10 supports thereon a pair of posts 9 and 9' which are disposed symmetrically with respect to the distribution table 1 and which support a light source 8 and a photodetector 8', respectively.

Mounted on the frame 11 are a plurality of weighing machines or weighing means 13, each weighing machine comprising a pool hopper 14 for receiving articles to be weighed from the supply trough 3, a weighing hopper 15 for receiving the articles from the pool hopper 14, a weighing mechanism 16 for weighing the articles in the weighing articles to be weighed from the supply trough 3, a weighing hopper 15 for receiving the articles from the pool hopper 14, a weighing mechanism 16 for weighing the articles in the weighing hopper 15, and a drive unit 19 for opening and closing the pool hopper 14 and the weighing hopper 15 with lever mechanisms 17 and 18. The supply trough 3 has a distal end projecting into the pool hopper 14 of the weighing machine 13 so that the articles from the supply trough 3 will be introduced into the pool hopper 14. A funnel-shaped chute 20 is supported on the frame 11 and has a flaring opening projecting slightly above an upper surface of the frame 11 for collecting the articles discharged from the weighing hoppers 15 of the weighing machines 13 and discharging the articles onto a bucket conveyor or into a packaging machine, not shown.

Articles to be weighed are supplied to the distribution table 1 and then distributed into the supply troughs 3 due to vibratory motion of the electromagnetic vibrating unit 7. The articles are supplied from the supply troughs 3 to the pool hoppers 14 and then into the weighing hoppers 15 in which the articles are weighed. The articles which have been weighed are discharged down into the chute 20 onto the bucket conveyor or a packaging machine, not shown. The objects to be weighed are supplied onto the distribution table 1 by a supply conveyor (not shown) which is controlled by a light signal transmitted from the light source 8 to the photodetector 8' so that the distribution table 1 is always supplied with a constant number of the articles to be weighed.

FIG. 2 illustrates the electromagnetic vibrating unit 2, which includes an electromagnet 206 attached to and supported on a pedestal 208 by means of fixing bolts 204 and adjustable by adjustment nuts 203 threadedly engaged with the corresponding bolts 204. A moving core 201, supported by a leaf spring 207, is disposed above and confronts the electromagnet 206, and is further attached to a fixing plate 205 on which the distribution table 1 is firmly secured. The vibrator assembly is enclosed within an electromagnetic cover 202 supported on vibration preventing springs 209.

Figure 3:
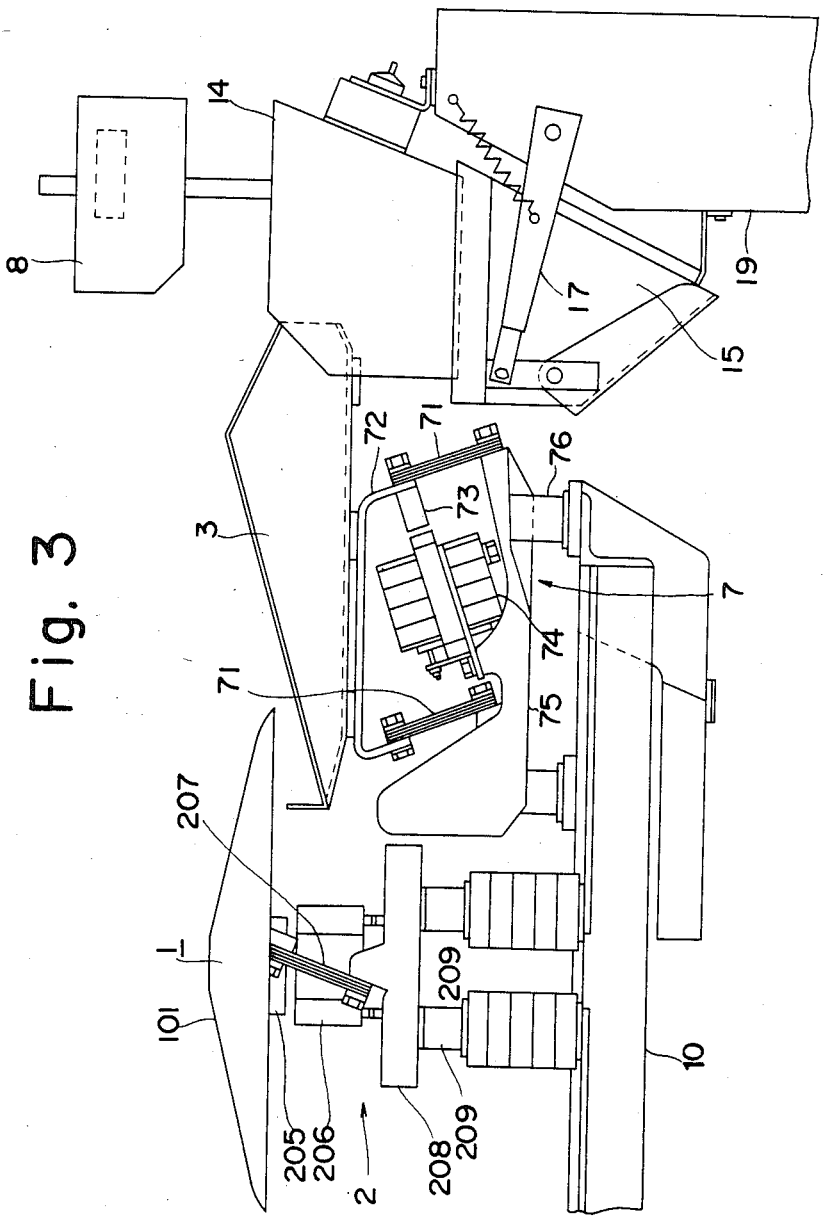
FIG. 3 is a side view illustrating a principal portion of a combination computing-type automatic weighing apparatus to which an embodiment of the distribution table of the present invention is applied.

In operation, the electromagnet 206 is intermittently supplied with an electric current in order to vibrate the moving core 201 by attracting the moving core 201 against the action of the leaf spring 207 whenever the current flows, and allowing the leaf spring 207 to return the moving core 201 whenever the current flow is interrupted. Because of the angle at which the leaf spring 207 is attached, as shown in FIG. 3, the vibratory motion of the moving core 201 is composed of both vertical and rotational components, so that the distribution table is vibrated in a helically reciprocating manner by the moving core through the plate 205. As a result, the articles carried on the distribution table 11 and vibrated thereby are caused to move in a radial manner.

FIG. 3 illustrates an application of a distribution table embodying the present invention, in which the distribution table 1 is a slightly truncated conical body having a flattened upper surface 101 whose shape is suitable for feeding articles that are difficult to roll, such as parallelopiped-shaped articles. The electromagnetic vibrating unit 7 includes an electromagnet 74 disposed on a fixing member 75 which is supported above the support table 10 by coil springs 76, a plurality of leaf springs 71 having one end thereof attached to the fixing member 75 and the other end thereof secured to a movable frame 72, and a moving core 73 attached to said other end of the leaf springs 71 and moved by the electromagnet 74. The electromagnetic vibrating unit 7 operates in the same manner as the electromagnetic vibrating unit 2 described above.

Figure 4:
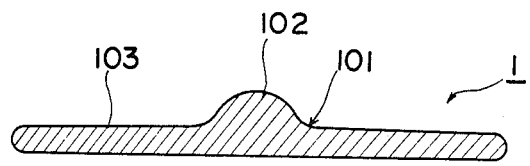
FIGS. 4 and 5 are side elevational views illustrating second and third embodiments, respectively, of a distribution table according to the present invention.

A second embodiment of a distribution table in accordance with the present invention is shown in FIG. 4, wherein the distribution table 1 comprises a substantially circular disk having a hemispherical central projection 102 and a substantially flat surface 103 surrounding the projection 102. The upper surface 101 in this case has a shape ideal for feeding articles that roll without difficulty.

Figure 5:
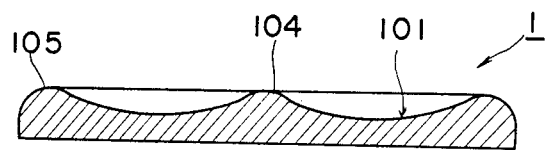

FIG. 5 illustrates a third embodiment of a distribution table according to the present invention. The distribution table 1 comprises a substantially circular disk having a slightly rounded projection 104 at the center thereof, and an annular projection 105, of a substantially semicircular cross-section and of approximately the same height as the projection 104, formed along the upper outer periphery of the disk, the projections 104, 105 defining a gently curving recess between them. In this embodiment the upper surface 101 of the distribution table 1 has a shape suitable for feeding articles that are extremely easy to roll. It should be noted that increasing or decreasing the size of the annular projection 105 will make it possible to regulate the movement of the articles to be supplied onto the upper surface of the distribution table 1, so that exchanging the distribution table for one having a suitably sized annular projection 105 will enable weighing to be carried out smoothly even when there is a change in such conditions as the weighing speed.

In accordance with the present invention as described and illustrated hereinabove, the distribution table is shaped so as to conform to the mobility of the articles that are to be supplied onto the table. As a result, selecting and using a distribution table of the proper shape assures the feed rate best suited to the article processing ability of the automatic weighing apparatus, making possible a smooth weighing operation in which there will always be an adequate supply of the articles without the articles piling up because of extended residence in the article supply path.

Although certain preferred embodiments have been shown and described in detail, it should be understood that many changes and modifications may be made therein without departing from the scope of the appended claims.

What I claim is:

1. An apparatus for controlling the feed rate of articles in an automatic weighing apparatus, comprising:
   a distribution table having an upper surface formed with a centrally located hemispherical projection and a flat portion surrounding the projection;
   means, connected to said distribution table, for subjecting the distribution table to helical reciprocatory vibration; and
   a plurality of radially extending, independently vibratable troughs disposed about the outer circumference of said distribution table for receiving articles distributed by the distribution table.

2. A combinatorial weighing apparatus, comprising:
   a base;
   means, provided on said base, for combinatorially weighing batches of articles and discharging selected batches of articles having a combined weight closest or equal to a target weight;
   a distribution table, provided on said base, for supplying said articles to said weighing means, said distribution table having an upper surface formed with a centrally located hemispherical projection and a flat portion surrounding the projection; and
   means connected to said distribution table, for vibrating said distribution table.

* * * * *